United States Patent [19]
Acker et al.

[11] Patent Number: 5,692,774
[45] Date of Patent: Dec. 2, 1997

[54] LATERAL IMPACT GAS BAG

[75] Inventors: Dominique Acker, Alfdorf; Thomas Herpich, Uhingen-Sparwiesen; Gunter Maier, Donzdorf-Winzingen, all of Germany

[73] Assignee: TRW Occupant Restraint Systems GmbH, Alfdorf, Germany

[21] Appl. No.: 693,156

[22] PCT Filed: Nov. 30, 1995

[86] PCT No.: PCT/EP95/04731

§ 371 Date: Aug. 2, 1996

§ 102(e) Date: Aug. 2, 1996

[87] PCT Pub. No.: WO96/16842

PCT Pub. Date: Jun. 6, 1996

[30] Foreign Application Priority Data

Dec. 2, 1994 [DE] Germany .................. 44 43 027.2

[51] Int. Cl.⁶ .................................................. B60R 21/24
[52] U.S. Cl. .................... 280/729; 280/743.1; 280/730.2
[58] Field of Search ........................... 280/730.2, 743.1, 280/730.1, 729, 728.1

[56] References Cited

U.S. PATENT DOCUMENTS

| | | | |
|---|---|---|---|
| 4,262,931 | 4/1981 | Strasser et al. | 280/729 |
| 5,273,309 | 12/1993 | Lau et al. | 280/730.2 |
| 5,340,151 | 8/1994 | Sato | 280/743.1 |
| 5,454,595 | 10/1995 | Olson et al. | 280/743.1 |
| 5,520,413 | 5/1996 | Mossi et al. | 280/729 |
| 5,586,782 | 12/1996 | Zimmerman, II et al. | 280/730.2 |

FOREIGN PATENT DOCUMENTS 6227348  8/1994  Japan .................. 280/730.2

*Primary Examiner*—Christopher P. Ellis
*Attorney, Agent, or Firm*—Tarolli, Sundheim, Covell, Tummino & Szabo

[57] ABSTRACT

A lateral impact gas bag for a vehicle occupant restraining system, comprising a wall 12 with an inlet opening 11 and a partition 15 in the interior of the gas bag to divide the internal space of the gas bag 10 into two adjacent chambers 30, 35, which may communicate with one another by a connecting opening 38 formed in the partition 15, is to be more rapidly positioned during a collision and shall more rapidly provide preliminary protection for an occupant of the vehicle. For this purpose the gas bag is so designed that the two chambers 30, 35 are elongated and the longitudinal extent thereof coincides with the preferred deployment direction, that the inlet opening 11 is provided at a first longitudinal end and the connecting opening 38 is provided at a second longitudinal end of the first chamber 30 and that the connecting opening 38 is shut off, in the folded condition of the wall 12, by overlying wall parts and during deployment of the wall 12 is only released on reaching a point adjacent to the second longitudinal end of the first chamber 30.

7 Claims, 3 Drawing Sheets

LATERAL IMPACT GAS BAG

BACKGROUND OF INVENTION

The invention relates to a lateral impact gas bag for a vehicle occupant restraining system comprising a wall in which an inlet opening for the inflation of the gas bag is provided, and furthermore a partition in the interior of the gas bag, which divides the interior of the gas bag into two adjacent chambers, which may communicate with each other through a connecting opening formed in the partition, the wall of the gas bag being folded up in a space saving manner in a stowed condition thereof and the gas bag is adapted to deploy during inflation generally in a preferred deployment direction extending from the inlet opening.

Such a lateral impact gas bag is provided to protect a vehicle occupant during a lateral collision both in the case of a lateral impact of the vehicle against an obstacle and also in the case of a lateral impact of another object against the vehicle. Unlike conventional gas bags, which are arranged in front of the vehicle occupant looking in the longitudinal direction of the vehicle, a gas bag for such an impact must obviously be inflated at the side of the vehicle occupant. Gas bags of this type are generally placed either in a door cladding or in a lateral section of the seat.

As regards the position of installation and the purpose of use of such a gas bag there are more particularly two requirements. On the one hand such a gas bag must have a comparatively small thickness owing to the limited space available for its deployment while on the other hand such a gas bag must be able to be inflated extremely rapidly owing to the very short crumple zone available on lateral impact.

In the case of gas bags in accordance with the prior art the flattened form of the inflated gas bag is maintained by tethers or additional fabric walls, which must be separately stitched in place. A short inflation time may be ensured in the case of a lateral impact gas bag if the gas bag is designed with a comparatively small volume. This however involves reduction in the protective action, since a larger gas bag also means improved protection of the vehicle occupant.

SUMMARY OF THE INVENTION

The object of the invention is to provide a gas bag which even prior to its complete deployment is able to ensure preliminary protection for a vehicle occupant and for this purpose becomes suitably positioned even during its deployment.

This object is achieved in the case of a gas bag of the type initially mentioned in that the two chambers are elongated and the longitudinal extent thereof coincides with the preferred deployment direction, that the inlet opening is provided at a first longitudinal end and the connecting opening is provided at a second longitudinal end of the first chamber and that the connecting opening is shut off, in the folded condition of the wall, by overlying wall parts and during deployment of the wall is only released on reaching a point adjacent to the second longitudinal end of the first chamber. Owing to this design in accordance with the invention for a lateral impact gas bag it is possible to ensure that at first the first chamber of the gas bag is filled and correctly positioned so that preliminary protection is provided more quickly for a vehicle occupant and that after this the second chamber is inflated so that the full protective action is available.

In accordance with the preferred embodiment the wall is manufactured of a single fabric part, which comprises a first and a second ply and an intermediately placed middle ply, the partition being constituted by a middle strip of the middle ply which divides the middle ply into a first and a second section. This embodiment offers the advantage that the partition may be formed by a single fabric part and no additional tethers or fabric walls are necessary which have to be separately stitched in place. This renders possible low-price production of the gas bag in accordance with the invention.

In accordance with the preferred embodiment the wall furthermore extends in a cross section perpendicular to the preferred deployment direction substantially in the form of a figure eight, and the gas bag is formed from the fabric part in that the first ply is folded over the first section of the middle ply and a second marginal part, extending in the preferred deployment direction on the side of the second ply, of the middle strip of the middle ply is stitched to a marginal part, extending over the first section, of the first ply, and at the transition between the first ply and the middle ply a first fold line is produced extending in the preferred deployment direction, in that the second ply is folded over the second section of the middle ply and a first marginal part, extending in the preferred deployment direction on the side of the first ply, of the middle strip of the middle ply is able to be stitched to a marginal part extending over the second section, of the second ply, and at the transition between the second ply and the middle ply a second fold line is produced extending in the preferred deployment direction and in that the outer edges of the gas bag are stitched together. Owing to this design of the gas bag it is possible for the partition to be stitched along its entire length to the fabric plies of the wall, something which reduces surface load on the seam and the fabric in comparison with a design having tethers for stabilizing the flattened form.

The preferred embodiment of the invention will be described below with reference to the drawings in which FIG. 1 shows the gas bag in the folded state.

DETAILED DESCRIPTION OF INVENTION

Figure 1:
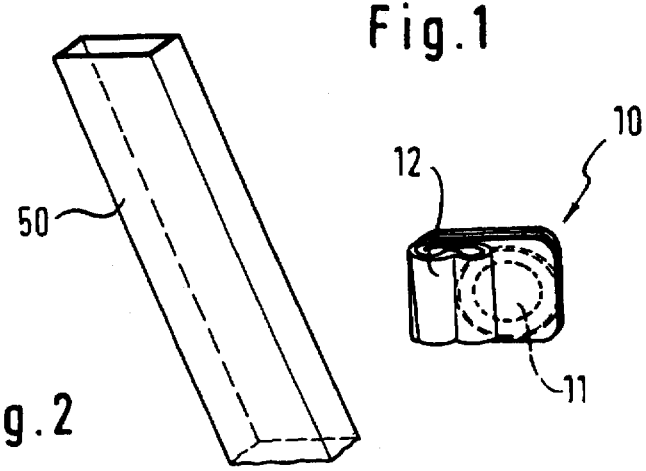

In FIGS. 1 through 4 the gas bag in accordance with the invention is represented in various different conditions. In FIG. 1 the reader will perceive the gas bag 10 in the folded condition, same being for example arranged in the door cladding of a motor vehicle. The gas bag 10 (see also FIG. 5) comprises two plies 18 and 20 of fabric connected with a middle ply of fabric comprising two sections 14 and 16 and a middle strip 15. In the ply 18 an inlet opening for the gas generated on triggering the restraining system by a gas generator (not illustrated) for the inflation of the gas bag 10 is formed, and in the middle strip 15 a connecting opening 38 is formed, through which a first chamber 30, formed in the stitched gas bag 10, of the gas bag 10 is able to communicate with a second chamber 35 (see also FIG. 6).

Figure 4:
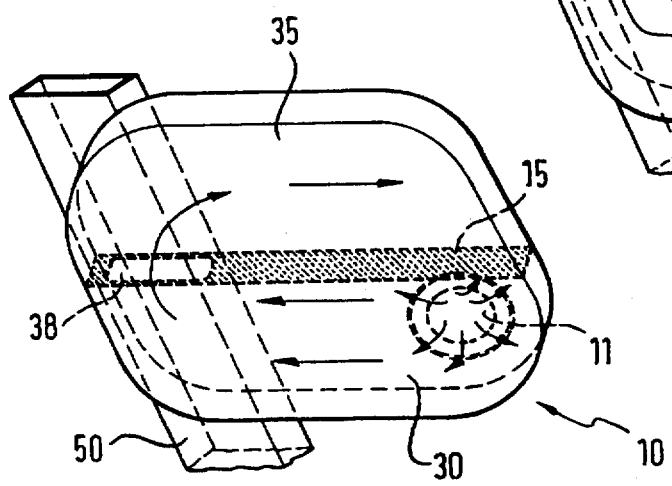
FIG. 4 shows the gas bag of FIG. 1 in a completely deployed state.

The gas bag 10, whose inflated form is to be perceived in FIG. 4, is brought into the folded state represented in FIG. 1 by firstly longitudinally folding the empty, spread out gas bag substantially along the partition 15 such that the wall of the second chamber 35 is folded onto the wall of the first chamber 30. Then the wall of the two chambers is rolled up, starting from the longitudinal end remote from the inlet opening 11, of the folded wall 12 toward the inlet opening 11. The result of such folding is to be seen in FIG. 1, in which to the left adjacent to the inlet opening 11 the rolled up part of the wall 12 is to be seen. In FIG. 1 the reader will furthermore see the B column 50 of the vehicle, which symbolizes a part of the vehicle's structure, which on lateral impact is particularly hazardous for a vehicle occupant and therefore must be cushioned by a deployed gas bag.

It will be seen from the arrangement of the gas bag that in the case of a lateral impact the gas bag must preferentially deploy in the longitudinal direction of the vehicle in order to cover a large lateral area of the vehicle's structure, more particularly the B column 50 thereof. Owing to the particular configuration of the gas bag in accordance with the invention the preferred deployment direction is such that the partition of the gas bag extends substantially horizontally in the inflated state thereof.

Figure 2:
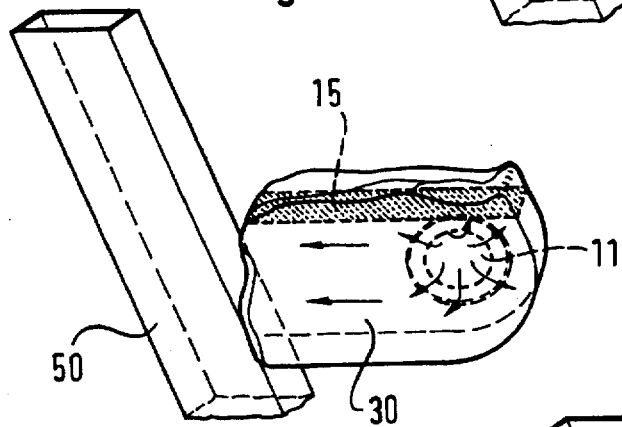
FIG. 2 shows the gas bag of FIG. 1 in a condition in which the first chamber is partially deployed.

In FIG. 2 the gas bag 10 is to be seen with its first chamber 30 partially inflated. The gas flowing into the gas bag 10 through the inlet opening 11 after the firing of a gas generator (not illustrated) is symbolically indicated by arrows, and firstly the first chamber 30 is deployed along the preferred deployment direction of the gas bag 10, coinciding with the longitudinal direction of the chamber, towards the B column.

Figure 3:
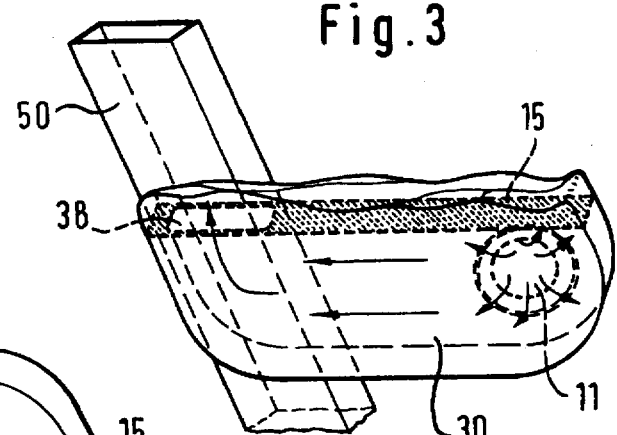
FIG. 3 shows gas bag of FIG. 1 with the first chamber completely deployed.

In FIG. 3 the gas bag 10 is to be seen with the first chamber 30 completely deployed. At the end of the partition 15 remote from the inlet opening 11 the reader will more particularly see the connecting opening 38, by which the second chamber 35 is connected with the first chamber 30. This connecting opening 38 is substantially only opened in the condition indicated in FIG. 3 of the gas bag, since it is previously shut off by the overlying wall parts of the gas bag 10. Since such connecting opening 38 is only opened when the first chamber 30 is substantially completely deployed, the gas bag 10 is, during a first stage of the deployment action, substantially solely inflated in the preferred deployment direction, for which reason it reaches a position particularly quickly in which it can provide preliminary protection for a vehicle occupant.

After the termination of such first stage of the inflation process, the second chamber 35 is filled through the first chamber 30 and the connecting opening 38 so that the gas bag assumes the completely deployed form indicated in FIG. 4 and can offer ample protection for a vehicle occupant.

Figure 5:
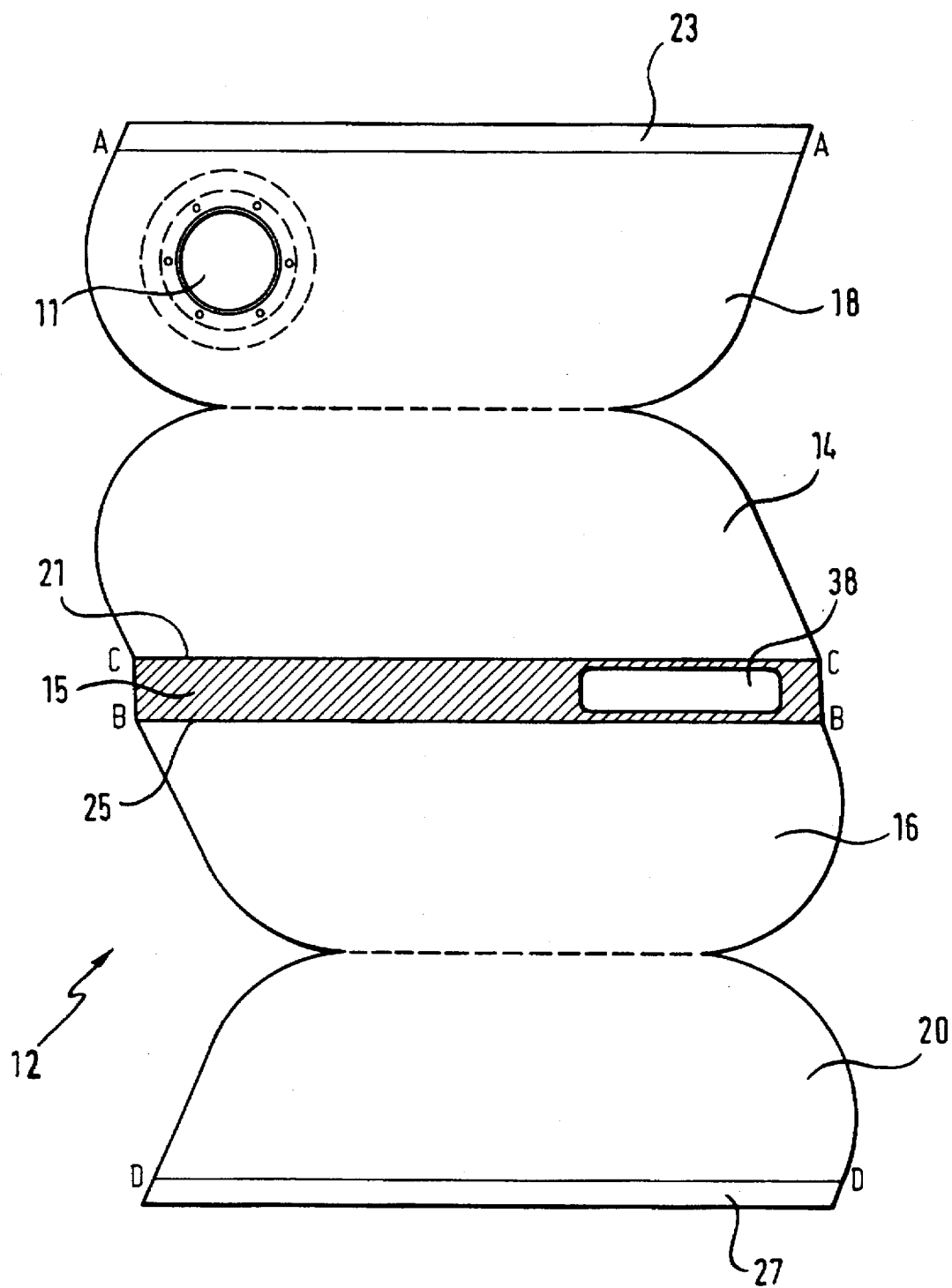
FIG. 5 shows the fabric part employed for the manufacture of the gas bag in accordance with the invention.

In accordance with the preferred embodiment of the invention the gas bag is manufactured from a single fabric part, the partition 15 more particularly also being a part of such fabric part so that it does not have to be separately stitched in place. This fabric part is represented in FIG. 5. The reader will see in this figure that the fabric part consists of a first ply 18, a second ply 20 and a middle ply arranged between such two plies and which is constituted by a first section 14, a second section 16 and a middle strip 15 placed between the same. This strip 15 constitutes the partition in the gas bag when stitching has been completed. In FIG. 5 the inlet opening 11 arranged in the first ply 18 and the connecting opening 38 provided in the middle strip 15 are to be seen.

The gas bag is formed from this fabric part (see also FIG. 6) in that the first ply 18 is folded over the first section 14 of the middle ply in such a manner that a second marginal part 25, extending in the preferred deployment direction on the side of the second ply 16, of the middle strip 15 of the middle ply is able to be stitched to a marginal part 23, extending over the first section 14, of the first ply 18, and at the transition between the first ply 18 and the middle ply 14 a first fold line 40 is produced extending in the preferred deployment direction, in that the second ply 20 is folded over the second section 16 of the middle ply in such a manner that a first marginal part 21, extending in the preferred deployment direction on the side of the first ply 18, of the middle strip 15 of the middle ply is able to be stitched to a marginal part 27, extending over the second section 16, of the second ply 20 and at the transition between the second ply 20 and the middle ply a second fold line 42 is produced extending in the preferred deployment direction.

Then the first marginal part 21 or, respectively, the second marginal part 25 of the middle strip 15 is stitched to the marginal part 27 of the second ply 20 or, respectively, the marginal part 23 of the first ply 18. Such seams are indicated in FIG. 6 as A–B and, respectively, C–D.

Figure 6:
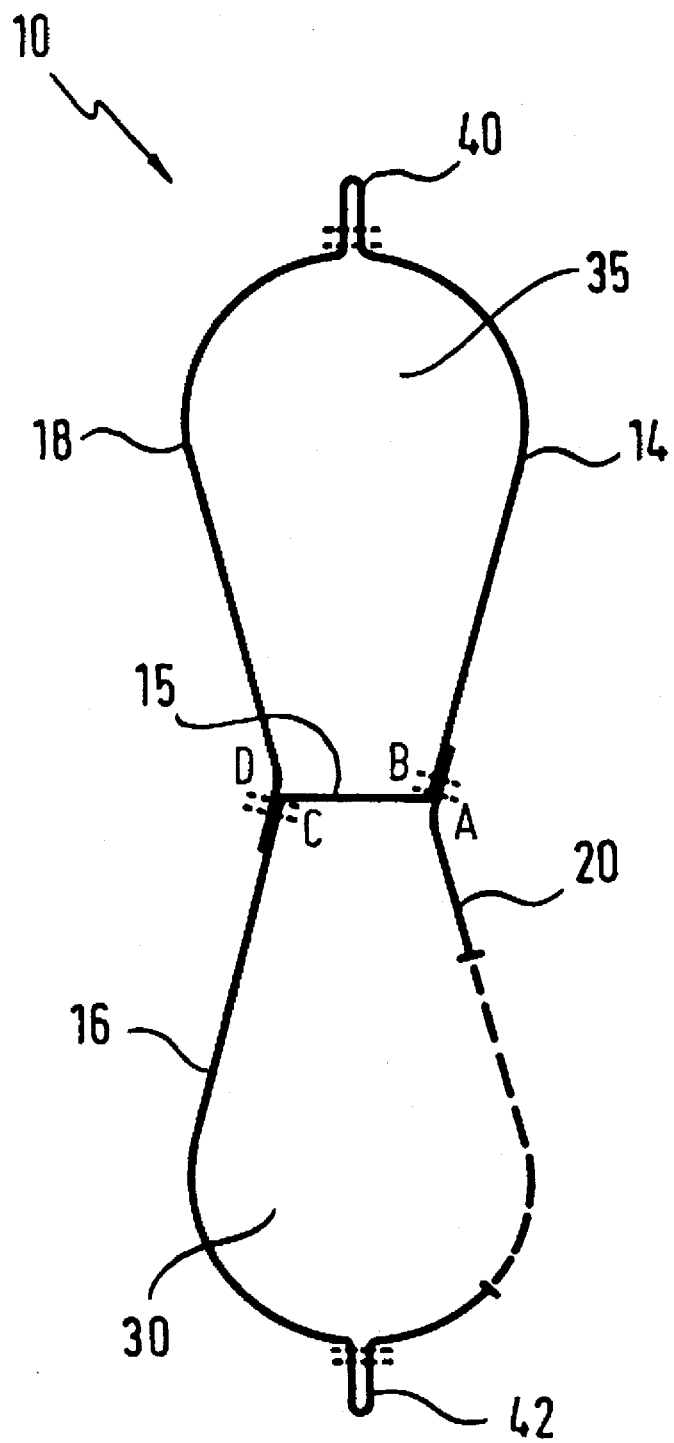
FIG. 6 shows a section taken through the inflated gas bag perpendicular to the preferred deployment direction.

Finally the outer edge of the first ply 18 or, respectively, of the second ply 20 is stitched to the outer edge of the first section 14 or, respectively, of the second section 16 of the middle ply, the fold line 40 and, respectively, 42 at the transition between the first ply 18 and, respectively, the second ply 20 and the corresponding section 14 or, respectively, 16 of the middle ply being able to be included in this seam as well, as is indicated in FIG. 6. In this figure the reader will furthermore see that the wall of the sewn gas bag extends generally in the form of a figure eight owing to this way of production. Furthermore it is to be seen that the first chamber 30 and the second chamber 35 possess substantially the same volume.

We claim:

1. A lateral impact gas bag for a vehicle occupant restraining system comprising a wall (12) in which an inlet opening (11) for the inflation of the gas bag (10) is provided, and furthermore a partition (15) in the interior of the gas bag, which divides the interior of the gas bag (10) into two adjacent chambers (30, 35), which may communicate with each other through a connecting opening (38) formed in the partition (15), the wall (12) of the gas bag (10) being folded up in a space saving manner in a stowed condition thereof and the gas bag (10) being adapted to deploy during inflation generally in a preferred deployment direction extending from the inlet opening (11), characterized in that the two chambers (30, 35) are elongated and the longitudinal extent thereof coincides with the preferred deployment direction, that the inlet opening (11) is provided at a first longitudinal end and the connecting opening (38) is provided at a second longitudinal end of the first chamber (30), and that the connecting opening (38) is shut off, in the folded condition of the wall (12), by overlying wall parts and during deployment of the wall (12) is only released on reaching a point adjacent to the second longitudinal end of the first chamber (30).

2. The gas bag as claimed in claim 1, characterized in that in the stowed state the wall (12) is folded up by longitudinal folding substantially along the partition (15) and by superposition starting at the longitudinal end, remote from the inlet opening (11), of the folded wall (12) towards the inlet opening (11).

3. The gas bag as claimed in claim 2, characterized in that the longitudinally folded wall (12) is rolled up towards the inlet end in the stowed condition.

4. The gas bag as claimed in claim 1, characterized in that the wall (12) is formed from a single fabric part, which comprises a first and a second ply (18, 20) and an intermediately placed middle ply (14, 15, 16), the partition being constituted by a middle strip (15) of the middle ply (14, 15, 16) which divides the middle ply (14, 15, 16) into a first and a second section (14, 16).

5. The gas bag as claimed in claim 4, characterized in that the wall (12) extends in a cross section perpendicular to the preferred deployment direction substantially in the form of a figure eight and in that the gas bag (10) is formed from the fabric part in that the first ply (18) is folded over the first section (14) of the middle ply and a second marginal part (25), extending in the preferred deployment direction on the side of the second ply (16), of the middle strip (15) of the middle ply is stitched to a marginal part (23), extending over the first section (14), of the first ply (18), and at the transition between the first ply (18) and the middle ply (14) a first fold line (40) is produced extending in the preferred deployment direction, in that the second ply (20) is folded over the second section (16) of the middle ply and a first marginal part (21), extending in the preferred deployment direction on the side of the first ply (18), of the middle strip (15) of the middle ply is stitched to a marginal part (27) extending over the second section (16), of the second ply (20) and at the transition between the second ply (20) and the middle ply a second fold line (42) is produced extending in the preferred deployment direction and in that the outer edges of the gas bag (10) are stitched together.

6. The gas bag as claimed in claim 1, characterized in that in the inflated state of the gas bag (10) the partition (15) extends substantially horizontally and in the direction of the longitudinal axis of the vehicle.

7. The gas bag as claimed in claim 1, characterized in that the first and the second chambers (30, 35) possess substantially the same volume.

\* \* \* \* \*